United States Patent

Wilhelm et al.

[11] Patent Number: 6,036,408
[45] Date of Patent: *Mar. 14, 2000

[54] EXTRACTION APPARATUS FOR BULK MATERIAL CONTAINERS

[75] Inventors: Klaus Wilhelm, Austrasse 13 b, D-83022 Rosenheim; Walter Fritz, Bergkirchen, both of Germany

[73] Assignee: Klaus Wilhelm, Rosenheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/737,876

[22] PCT Filed: Oct. 2, 1995

[86] PCT No.: PCT/EP95/03890

§ 371 Date: Nov. 25, 1996

§ 102(e) Date: Nov. 25, 1996

[87] PCT Pub. No.: WO97/12823

PCT Pub. Date: Apr. 10, 1997

[51] Int. Cl.[7] .......................... B65G 53/40; B65G 53/24; B65G 23/14

[52] U.S. Cl. .......................... 406/113; 406/114; 406/134; 406/141; 406/142; 406/143; 406/151; 406/152; 406/153

[58] Field of Search .................................... 406/114, 141, 406/142, 143, 153, 152, 151, 134, 116, 115, 113

[56] References Cited

U.S. PATENT DOCUMENTS 3,951,462  4/1976  De Francisci ........................... 406/114

FOREIGN PATENT DOCUMENTS

| 528 755 | 2/1993 | European Pat. Off. . |
| 1406647 | 6/1965 | France ................................ 406/153 |
| 2800853 | 8/1978 | Germany . |
| 3926688 | 10/1990 | Germany . |

Primary Examiner—Christopher P. Ellis
Assistant Examiner—Kenneth W Bower
Attorney, Agent, or Firm—Haugen Law Firm PLLP

[57] ABSTRACT

An improved extraction apparatus for bulk material containers, in particular for bins (1) filled with a pourable bulk material (3), comprises a suction head which can be lowered onto the bulk material (3). According to the improvement, provision is made for the suction head (10) to be provided with a float (11), floating in or on the bulk material (3), and to be held above it, and for the oscillation control device (35) to be arranged in such a way that the suction head (10) and/or the float (11) can be caused at least indirectly to oscillate.

13 Claims, 3 Drawing Sheets

EXTRACTION APPARATUS FOR BULK MATERIAL CONTAINERS

The invention relates to an extraction apparatus for bulk material containers, in particular for bins filled with a pourable material.

In many technical fields, particularly also in the plastics-processing industry—but not only there—the starting products to be processed are in the form of a pourable bulk material. These are often delivered in filled bins, so-called Oktabin containers. A wide variety of emptying and extraction devices have been disclosed for emptying bins of this type with automatic material conveying. In these cases, there is often the problem that, depending on requirements, the bins firstly have to be emptied only partially and have to be stored again in the meantime until the respective bulk material is again required for processing.

Emptying bins of this type regularly takes place using extraction devices.

The most frequently used extraction device comprises a suction tube, also called a suction lance or suction pipe, which preferably comprises two tubes which are pushed one inside the other and, by means of spacers between the inner and the outer tubes, provide an air gap. Via this annular air gap, the conveying air required for pneumatic conveying is also sucked in. The suction tube is usually connected to a flexible conveying hose and is inserted into the bulk material from above. The suction pipe in the form of a double tube is intended to ensure that a specific minimum suction/flow velocity of, for example, 18 m/s for a pourable bulk material is maintained in each case.

In addition to the known methods in which the suction tube is usually inserted into the bulk material from above, methods have also been disclosed, in which the bulk material bins are tapped with the suction tube.

However, multiple problems occur with these methods and apparatuses.

For instance, it is always difficult to set and maintain the correct mixing ratio between air and bulk material for optimum pneumatic conveying. In particular, there is the risk, with a decreasing filling level in the bin, that the suction tube and its opening suddenly rest on the surface of the bulk material and, owing to a lack of material at the intake opening of the suction pipe, the conveying flow is reduced or interrupted.

It is likewise possible for the suction pipe to tilt in connection with the conveying hose and only to suck in air, as a result of which the conveying flow is likewise interrupted.

The suction hose can likewise also become jammed on the edge of the bin, such that the intake opening of the suction tube is no longer able to follow the decreasing filling level.

In the event of an excessive vacuum being generated and, as a consequence thereof, in the event of an excessive suction effect, the suction tube may additionally become blocked.

Finally, it has also been established that, in particular in the case of not readily pourable material, a cavity (void) is formed at the extraction point in the pourable material and, for this reason too, the conveying operation is interrupted owing to a lack of material at the extraction point.

Finally, it is even possible, in particular in the event of high vacuums, for the suction tube to suck through to the base of the bin and there to "choke" on a container film in which the pourable bulk material is generally contained in the bin.

If—as was described and mentioned above—the suction tube is fitted through the bin wall, the risk of the suction tube becoming blocked is additionally even greater. Additionally, the suction tube opening cannot follow the decreasing filling level of the pourable material in the bin, which means that, in this case, a relatively large residual quantity also remains in the bulk material container, which has to be extracted in another way.

Owing to these disadvantages, it is necessary for the bins to be monitored permanently by operating personnel and for the suction pipes to be adjusted manually, if appropriate.

In order to compensate at least partially for the disadvantages mentioned above, it has also already been proposed to provide pulsation and oscillation or vibration devices additionally. These are sometimes arranged on the outside wall of the bins, which is problematic, in particular in the case of bins made of cardboard and corrugated cardboard.

Additionally, vibration tables have also been proposed, on which the bins are placed. For large quantities, for example, several tons of bulk material, however, this requires enormous vibration plants.

Finally, a tilting apparatus for bins containing a pourable material placed on a pallet has been disclosed in German Patent 39 26 688, which comprises a tilting apparatus. Provided additionally is a discharge collection container which is provided outside the bin and is provided with a closable opening which is formed by an opening which is to be pierced in the wall of the bin on the side wall adjacent to the bottom of the bin. The extraction operation is then carried out in the tilted position of the bin by means of a suction tube connected to the discharge collection container provided outside the bin. However, this case involves an entire plant which is highly complex, extensive, and expensive, and is generally only suitable as a permanently installed unit.

The object of the present invention is to provide an extraction apparatus which is of a far simpler and more efficient construction compared to conventional solutions.

It must thus be described as quite surprising that, with the extraction apparatus according to the invention, the disadvantages mentioned at the beginning as occurring in the prior art are completely overcome. In this case, it is all the more surprising that the extraction apparatus according to the invention is of a very simple construction and is easy to handle and can also be dimensioned to be comparatively small.

The essence of the invention is that the extraction apparatus comprises a float which is arranged floating on the pourable bulk material. Arranged or formed on this float is the at least one extraction opening of at least one extraction line. Said float is merely placed on the bulk material from above with the lid of the bin removed. In this case, this flexible apparatus is not connected to the container. Additionally, above all, the bin itself also does not have to be destroyed on its outside wall, for example by tapping, (which has disadvantages above all if the pourable bulk material is not completely emptied at one time, but firstly another bin with a different content is to be connected to the extraction device).

In this case, the float can be immersed in the bulk material to a predefined immersion depth (for example between a minimum value and a maximum value) and, in this case, keeps the extraction opening of the extraction line in an optimum position.

With the extraction apparatus according to the invention, emptying of bulk material containers almost without residue is additionally possible without manual intervention. Above all, however, no sucking out can occur in the region of the extraction opening (voids) since, with a decreasing filling level, the float always automatically follows the height of the filling level.

In a preferred embodiment of the invention, a shaking or vibration device is additionally provided. Differing from the prior art, however, the latter is provided on the float itself, thus acting directly on the intake tube of the extraction device. Since the float itself can be of small dimensions, i.e., has only a comparatively small mass, only a small energy requirement is also necessary to loosen not readily pourable material, specifically above all in contrast to vibration tables and shakers or pulsation devices which always act on the entire mass of the bulk material and therefore have to be dimensioned to be correspondingly large.

By means of a vibration, shaker, or pulsator of such small dimensions, additionally virtually no dust occurs during loosening since the oscillation generator only acts locally and only in a floating manner.

In the extraction device according to the invention, multiple extraction can also be provided without difficulty, for example with two, three, or more, for example even five extraction tubes. The extraction openings of the individual extraction tubes are preferably arranged in a tube sleeve forming an extraction chamber in order to maintain an optimum ratio between the air to be sucked in and the bulk material to maintain an optimum extraction operation.

In a further development of the invention, the float is provided with a kind of float chamber. In a further development of the invention, said float chamber may be open toward the bottom so that the float can initially be inserted from above into the pourable material by pressing it in slightly at least in a partial height when the bin is open.

In addition or alternately, however, the float can also be of plate-like design and be held at least approximately in a horizontal position, for example by means of an external support and/or guide device. This is possible, for example, by means of a telescopic guide which serves merely for the positional alignment, in particular for the horizontal alignment, of the float, the float always being adjusted automatically owing to its own weight with a decreasing filling level. Guide alignments of this type, however, are not absolutely essential to achieve an optimum alignment position, in particular horizontal alignment. A float is preferably used, which always remains aligned in the desired position due to its "floating" position, thus always ensuring optimum adjustment of the at least one intake opening of the extraction tubes. Under some circumstances, if required, however, a guide device may also be provided, which comprises a plurality of ropes and thus additionally supports the so-called "float" in order to maintain said optimum positional alignment (generally horizontal position), auxiliary devices being preferred for this position, which devices, owing to the gravitational forces, should not impede automatic trailing of the float as a function of the decreasing filling level.

As has already been explained, in many applications the pourable bulk material cannot be introduced directly into the bin, consisting for example of cardboard, but is contained in a plastic film of appropriately large dimensions inserted into the bin. In order to ensure complete automatic emptying according to the invention, a tension device is furthermore provided for the film, which device is attached to the upper edge of the film with the bin lid removed. The film can be prestressed upward to a sufficient extent, for example by means of spring cables, with a force counter to the weight of the bulk material. As soon as the weight becomes less than the spring force, the film is raised from the edge so that the bulk material located on the outside flows together toward the middle and can be picked up by the extraction device here.

The invention is explained in greater detail below with reference to exemplary embodiments. In the figures, specifically FIG. 1 shows a diagrammatic side view, represented partially in section, of a first exemplary embodiment of an extraction apparatus according to the invention for bulk material;

Figure 1:
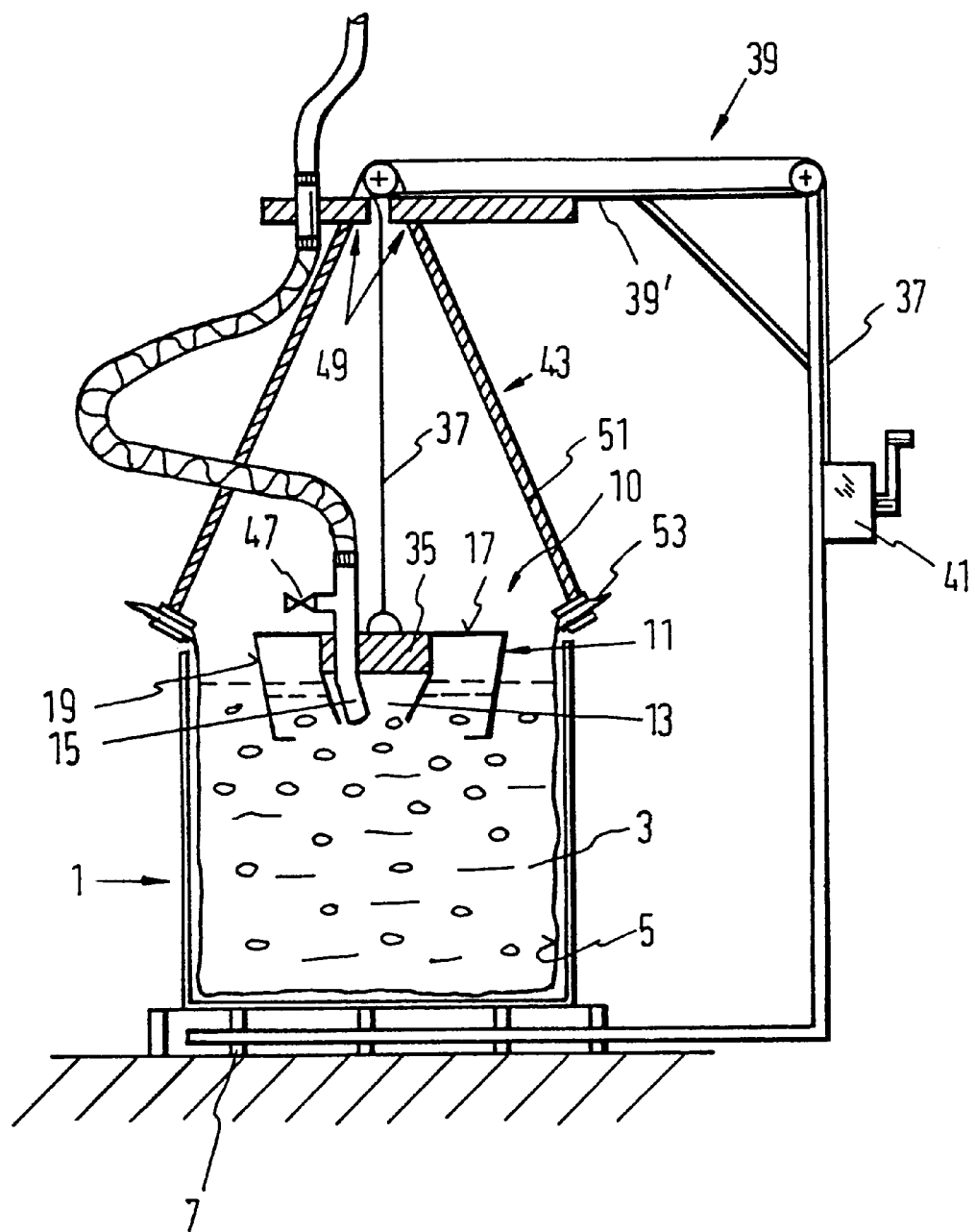
FIG. 1 shows a diagrammatic vertical cross section illustration of a bin 1, for example in the form of a so-called Oktabin, which may consist, for example, of cardboard or corrugated cardboard and inside which there is a pourable bulk material 3, for example plastic granulate.

As can also be seen from FIG. 1, the bin 1 is usually lined with a film 5 which is designed in a bag-like manner and in which the bulk material 3 is contained so as to be protected from dust and moisture.

The bin 1 stands, for example with the lid removed, on a pallet 7.

FIG. 1 shows a diagrammatic cross section of a suction head 10 with a float 11. In the middle of the latter there is an extraction chamber 13.

The extraction chamber 13 is preferably arranged centrally in relation to the float 11 and may be designed in the manner of a tube sleeve, inside which there is at least one extraction tube 15 for extracting the pourable bulk material 3.

Figure 2:
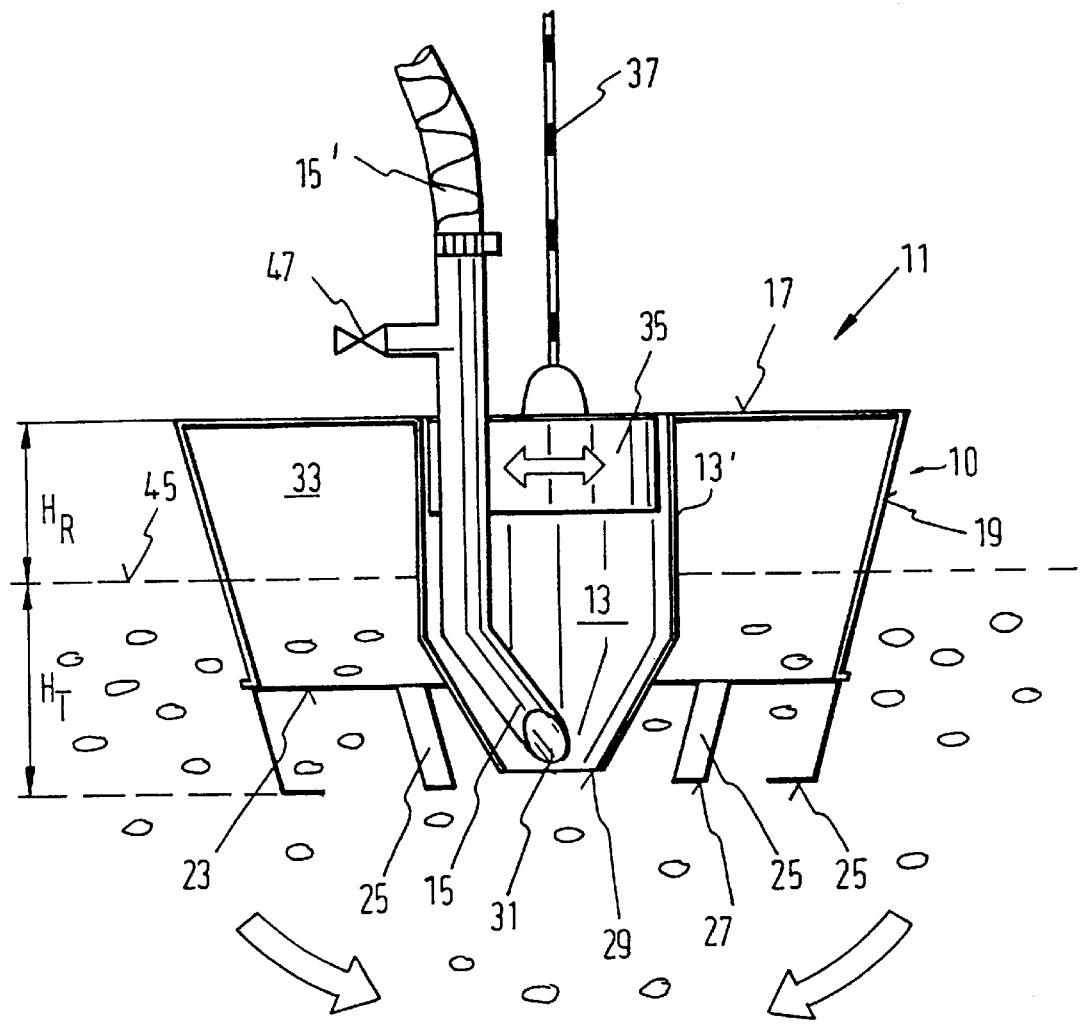
FIG. 2 shows an enlarged detail illustration of the float shown in FIG. 1.

In particular in accordance with the illustration of FIG. 1 or 2, the extraction device formed in this manner comprises a covering or floating plate 17 which is adjoined toward the bottom by a circumferential wall 19. In the exemplary embodiment illustrated, the circumferential wall 19 tapers conically toward the bottom.

Feet 25, located offset in the circumferential direction, are formed at the lower circumferential edge 23 (FIG. 2).

A chamber opening 27 is bounded by the lower circumferential edge 23.

Located preferably offset centrally inward thereto is the extraction chamber 13 mentioned which, in the exemplary embodiment shown, is likewise designed to be conically tapered toward the bottom at least in a partial height, preferably in its lower partial height, and there forms an intake chamber opening 29. The intake opening 31 of the at least one extraction tube 15 is preferably located in the region of the intake chamber opening 29. The intake opening 31 of the extraction tube 15, the intake chamber opening 29 of the chamber opening 27, and the lower boundary of the feet 25 are located approximately at the same height. In this case, the feet 25 can preferably come to rest at least slightly below the level formed by the intake chamber opening 29 or intake opening 31 of the extraction tube 15. The height of the feet is preferably a quarter to a third of the total height of the float. Generally only three feet are arranged located offset in the circumferential direction, so that bulk material 3 can also flow between them laterally up to the chamber opening 29 at the level of the feet.

Owing to this design principle, one or more air chambers 33 are formed between the circumferential wall 19 of the float 11 and the extraction chamber wall 13', which is or are closed toward the top and is or are opened only at the bottom in the region of its/their chamber opening 27.

The extraction tube 15 passes through the covering plate 17. A flexible extraction hose 15' may be connected to a projection which protrudes upward.

Furthermore, it can be seen from FIGS. 1 and 2 that a vibration device 35 is arranged on the float, below the covering plate 17 in the region of the extraction chamber 13 in the exemplary embodiment shown, as a result of which the extraction tube 15 as well as the float can in total be caused to vibrate. Also, since the total mass of the float is relatively small, a vibration device 35 of only small dimensions is required.

The entire arrangement can be suspended by means of a Boden control 37. In the exemplary embodiment shown, a support device shaped like a gallows serves as a suspension device 39 which is provided with a crank drive 41 shown diagrammatically in FIG. 1, by means of which the entire float 11 can be raised or lowered in the direction of the bin 1. The crank drive 41 can also be motor-driven.

In FIG. 1, a tension device 43 is furthermore provided for the film 5 which will be detailed later.

The mode of functioning is explained below.

A bin 1 to be emptied is moved, for example on a pallet 7, below the center of the suspension device 39. With the lid removed, the suction head 10 with the float 11 with the corresponding extraction device is lowered by means of the crank drive 41 with a slackened Boden control 37 from above onto the pourable bulk material 3. The entire float 11 with the extraction device is then moved by turning and/or pressing it slightly into a preferably central floating position in the bulk material 3, as is indicated in FIGS. 1 and 2. Since it is pressed in, bulk material can enter, at least to a partial height, the space between the circumferential edge 23 and the interior extraction chamber 13 so that the float 11 still protrudes upward to a residual height $H_R$ above the filling level height 45.

The Boden control 37 mentioned preferably consists of metal and thus at the same time also serves as grounding for dissipation in the case of static charging occurring which can occur during conveying.

By means of the circumferential wall 19 of the preferably rotationally symmetrical float preferably tapering conically downward, tilting with a decreasing filling level in the bin is prevented. Particularly due to the presence of bulk material below the air chambers 33 formed in the float 11 and surrounding the extraction chamber 13, a constantly stable floating position is achieved.

By means of the additionally connecting oscillation generator 35 in the form of a vibrator and/or pulsator, an adjustable oscillation can be transmitted to the float 11 and thus continuing to the bulk material, at least in that region where the intake opening 31 of the extraction tube 15 is located.

Particularly due to the oscillation, the bulk material 3 always flows into the cavity developing in the region of the outlet chamber opening 29 in which the intake opening 31 of the at least one extraction tube 15 is located. This design can always ensure that a favorable mixture of bulk material and air is maintained which prevents both blockages of the extraction opening of the extraction tube on the one hand and sucking-out on the other hand in order to maintain a continuous extraction operation of the bulk material.

In order to set an optimum quantity of conveying air for the respective conveying task, in the exemplary embodiment illustrated a valve 47 which can be adjusted from the outside is also provided above the suction head 10 and thus above the float.

The oscillation generator can be clocked and operated in such a way that the immersion depth $H_T$ of the float 11 always remains at least approximately the same, and a completely stable floating position can thus be ensured at all times.

Since the extraction tube 15 merges above the float 11 into a flexible extraction hose 15' which is dimensioned to be of sufficient length, it is ensured that the float can be lowered right to the bottom of the bin with a correspondingly dropping filling level height (however, telescopic tube systems are likewise also possible to allow adaptation to the different length of the extraction tube).

Differing from the exemplary embodiment shown, instead of the single extraction tube 15 shown in FIGS. 1 and 2, three extraction tubes may be provided, for example located offset in the circumferential direction, whose intake openings lie in all cases in the region of the intake chamber opening, and which from there, following the conical chamber wall, are guided firstly in plan view with a radial component and then vertically upward through the covering plate beyond the float.

During the lowering operation, the Boden control 37 is completely disconnected or is relieved at least to a great extent from stress, so that the float 11 can follow the dropping filling level height.

As soon as the float 11 has reached the bottom of the bin 1, the float 11 stands with its abovementioned feet 25 on the bottom of the bin, but is still surrounded by bulk material.

In order automatically to ensure virtually complete emptying, furthermore the tension device 43, already mentioned above, is provided, which comprises, for example, a plurality of carrying ropes which are located offset in the circumferential direction and either interact by means of a spring device or are designed to be elastic themselves. In the exemplary embodiment shown according to FIG. 1, the tension device 43 comprises, for example, three or four spring cables 51 which are anchored from an attachment point 49 on the horizontal crossmember 39' of the suspension device 39 and are attached at different points in the circumferential direction to the upper edge 53 of the film 5. By this means, a force counter to the weight of the bulk material 3 is transmitted to the film 5.

Figure 3:
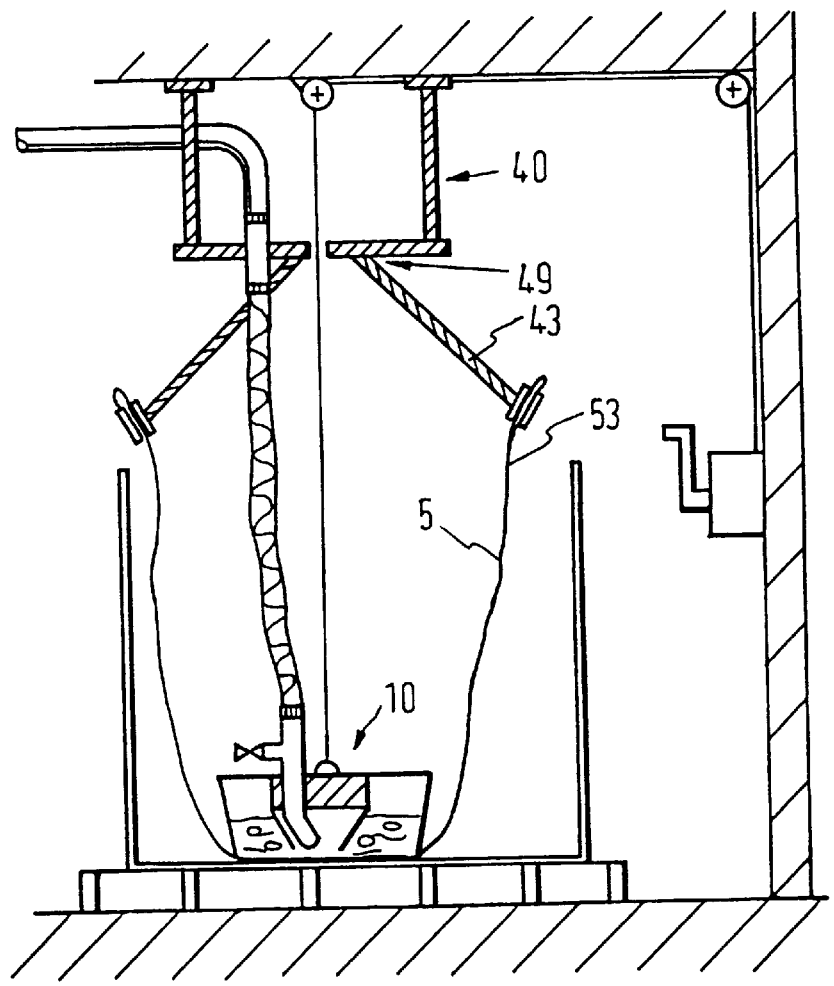
FIG. 3 shows an embodiment, modified slightly in relation to FIG. 1, in the end phase of the extraction operation.

As soon as the weight of the remaining residual quantity of the bulk material in the film 5 is less than the spring force of the spring cables 51, the film 5 is raised from its edge—as is indicated diagrammatically in FIG. 3—so that the bulk material located further to the outside flows even through the feet 25 on the bottom of the bin toward the middle, that is to say to the extraction cavity, i.e., the intake chamber opening 29, where it can be extracted virtually without residue.

It is furthermore indicated with reference to FIG. 3 that, differing from the exemplary embodiment according to FIG. 1, a support bracket 40 attached to a ceiling can also be used as suspension device 39.

The float explained can differ in its design from the exemplary embodiment shown. For example, closed float chambers may be provided. Under some circumstances, it is possible to use only a plate or plate-like device resting on the surface of the bulk material, on the underside of which one or more extraction chamber openings or double-tube systems similar to conventional intake lances project downward into the bulk material above the plane of the covering plate of the float thus formed. In order to achieve a constantly stable floating position, provision may be made, in particular in the exemplary embodiment of this type, instead of a single-part Boden control 37, for example for the covering plate to be slightly prestressed and held by means of a plurality of Boden control sections engaging offset in the circumferential direction. In this case, provision may be made for certain relief forces to be provided for the horizontal stabilization of the float thus formed, which forces, however, are in any case less than the dead weight of the total float so that the latter always drops with a decreasing filling level height of the bulk material, resting on the latter.

Insofar as the float is not intended to follow a decreasing filling level height of the granulate or bulk material solely due to its gravitational force, appropriate sensor devices must be provided, which allow automatic adjustment of the float with a decreasing filling level height by means of the suspension device.

What is claimed is:

1. An extraction apparatus for bulk material comprising a suction head which leads to a suction line having at least one intake opening wherein the suction head includes guide means to continuously lower said suction line from above and into bulk material to be discharged;
   (a) said suction head further including an oscillation control device and a float and being configured to be buoyantly supported by and float upon the top of said bulk material to be discharged and wherein the oscillation control device includes an oscillation generator which imparts oscillatory motion to said suction head and said float;
   (b) said suction head further includes an extraction chamber with an opening along the bottom surface and wherein said extraction chamber is disposed in a center of the float, and wherein said at least one intake opening is disposed adjacent said extraction chamber opening; and
   (c) wherein said extraction chamber is tapered conically downwardly and with the distal end of said extraction chamber disposed adjacent said bottom surface opening of said extraction chamber.

2. The extraction apparatus as claimed in claim 1, wherein the oscillation control device is provided in or on the float.

3. The extraction apparatus as claimed in claim 1 wherein the float comprises at least one air chamber.

4. The extraction apparatus as claimed in claim 1, wherein said float is closed at a top surface thereof by a covering plate and circumferentially by a circumferential wall and the chamber being provided with an opening on the bottom surface of said chamber.

5. The extraction apparatus as claimed in claim 1 wherein said suction head further includes an extraction chamber with an opening along the bottom surface and wherein said extraction chamber is disposed in a center of the float, and wherein said at least one intake opening is disposed adjacent said extraction chamber opening.

6. The extraction apparatus as claimed in claim 1, wherein the circumferential wall of said float tapers inwardly toward the bottom surface of said float.

7. The extraction apparatus as claimed in claim 1, wherein said float is arranged to be raised and lowered by guide means.

8. The extraction apparatus as claimed in claim 1, wherein support stops or feet having lower surfaces are provided along the bottom surface of said float.

9. The extraction apparatus as claimed in claim 8, wherein the intake opening of said suction line is located substantially at and slightly above a plane of the lower surfaces of said support steps or feet.

10. The extraction apparatus as claimed in claim 1, wherein the means to continuously lower the suction line includes said float supported in a horizontal position by an external guide device.

11. The extraction apparatus as claimed in claim 10, wherein the guide device comprises a suspension device, preferably in the form of ropes or chains, which engages on said float at a plurality of engagement points.

12. An extraction apparatus for bulk material comprising a suction head which leads to a suction line having at least one intake opening wherein the suction head includes guide means to continuously lower said suction line from above and into bulk material to be discharged;
   (a) said suction head further including an oscillation control device and a float and being configured to be buoyantly supported by and float upon the top of said bulk material to be discharged and wherein the oscillation control device includes an oscillation generator which imparts oscillatory motion to said suction head and said float;
   (b) said suction head further includes an extraction chamber with an opening along the bottom surface and wherein said extraction chamber is disposed in a center of the float, and wherein said at least one intake opening is disposed adjacent said extraction chamber opening; and
   (c) wherein said oscillation generator is mounted inside said extraction chamber in superimposed relationship to said extraction chamber opening.

13. An extraction apparatus for bulk material comprising a suction head which leads to a suction line having at least one intake opening wherein the suction head includes guide means to continuously lower said suction line from above and into bulk material to be discharged;
   (a) said suction head further including an oscillation control device and a float and being configured to be buoyantly supported by and float upon the top of said bulk material to be discharged and wherein the oscillation control device includes an oscillation generator which imparts oscillatory motion to said suction head and said float; and
   (b) said extraction apparatus further comprises a tension device for a film which receives said bulk material to be discharged from bulk material containers, said tension device being attached to an edge of the film so that when a force exerted by the weight of said bulk material remaining in said bulk material containers is less than the spring force of said tension device, the film is movable within said bulk material containers to receive said remaining bulk material from said bulk material containers.

* * * * *